(12) United States Patent
Pickrell et al.

(10) Patent No.: US 8,151,862 B2
(45) Date of Patent: Apr. 10, 2012

(54) ONE-PIECE MANUFACTURING PROCESS

(75) Inventors: Kevin Pickrell, Columbus, OH (US);
Mark J. Kuzdzal, Allegany, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 12/917,750

(22) Filed: Nov. 2, 2010

(65) Prior Publication Data

US 2011/0100580 A1    May 5, 2011

Related U.S. Application Data

(60) Provisional application No. 61/258,524, filed on Nov. 5, 2009.

(51) Int. Cl.
*B22D 19/00* (2006.01)
(52) U.S. Cl. ............................ 164/100; 164/96; 164/112
(58) Field of Classification Search .................... 164/98, 164/100, 112
See application file for complete search history.

(56) References Cited

U.S. PATENT DOCUMENTS

| 4,231,413 A | 11/1980 | Bretzger |
| 2006/0026832 A1 | 2/2006 | Bergue et al. |
| 2009/0008264 A1 | 1/2009 | McGee et al. |
| 2009/0126190 A1 | 5/2009 | Grzondziel et al. |

FOREIGN PATENT DOCUMENTS

| WO | 2009122040 A1 | 10/2009 |
| WO | 2011056780 A2 | 5/2011 |

OTHER PUBLICATIONS

PCT/US2010/055081 Notification of Transmittal of the International Search Report and the Written Opinion of the International Searching Authority, or the Declaration dated Jun. 7, 2011.

*Primary Examiner* — Jessica L Ward
*Assistant Examiner* — Nicholas D'Aniello
(74) *Attorney, Agent, or Firm* — Edmonds & Nolte, PC (57) ABSTRACT

A method of making a turbomachine part, wherein the can include machining a blank into a base having blades extending therefrom, the blades defining a channel therebetween. The method can also include forming a bridge in the channel between the blades, and forming a cover on the tops of the blades and over the channel, such that the base, the blades, and the cover form a single substantially homogenous turbomachine part once the bridge is removed.

20 Claims, 10 Drawing Sheets

ONE-PIECE MANUFACTURING PROCESS

CROSS-REFERENCE TO RELATED APPLICATIONS

This application claims priority to U.S. patent application Ser. No. 61/258,524, which was filed Nov. 5, 2009. This priority application is hereby incorporated by reference in its entirety into the present application, to the extent that it is not inconsistent with the present application.

BACKGROUND

Various methods of fabricating turbomachinery parts, including impeller blades, diaphragms, and guide vanes, are known. Typically, such parts are assembled from smaller forged and machined parts. The smaller parts are machined to tight tolerances and then fixed together such as by welding, brazing, or e-brazing.

However, such machining and fixing processes are time-intensive and costly, and typically yield turbomachinery parts that are comprised of multiple distinct pieces. Having these multiple distinct pieces necessitates joints where stress can be concentrated, which can lead to deformation or even failure, thereby reducing the effective life of the turbomachinery part.

One way of overcoming this is by casting the part as a whole. However, casting is typically not useful in parts requiring tight tolerances. Further, the finished casting surface can be rough compared to machined surfaces. In parts that manipulate high velocity and/or pressure fluid, the roughness of the surface and the tolerances are critical to efficiency, such that casting is not typically useful for many turbomachine parts. What is needed, therefore, is a method of making turbomachine parts that does not suffer from the stress, time-consumption, and/or other drawbacks of the multiple-piece assemblies, or the inaccuracy and/or other drawbacks of conventional casting methods.

SUMMARY

Embodiments of the disclosure may provide a method of making a one-piece part, the method including machining a blank into a base and first and second appendages extending from the base, the first and second appendages each having a side, the side of each of the first and second appendages together defining a channel therebetween; forming a bridge in the channel; forming a cover on the first and second appendages such that the base, the first and second appendages, and the cover form a single, unitary structure; and removing the bridge.

Embodiments of the disclosure may further provide a method of making a turbomachine part, wherein the method includes machining a blank into a base having first and second blades extending therefrom, the first and second blades each having a side, the side of each of the first and second blades together defining a channel therebetween. The method further includes forming a bridge in the channel between the first and second blades, forming a cover on first and second tops of the first and second blades, respectively, and over the channel, such that the base, the first and second blades, and the cover form a single substantially homogenous structure, and then removing the bridge.

Embodiments of the disclosure may further provide a method of making a turbomachine part, wherein the method includes machining a blank into a base and first and second blades extending from the base, the first and second blades each having a top and a side, wherein the side of each of the first and second blades and the base together define a channel between the first and second blades. The method may further include forming a bridge across the channel using a ceramic slurry, forming a cover on the first and second blades and the bridge such that the base, the first and second blades, and the cover form a single substantially homogenous structure, and then removing the bridge.

Embodiments of the disclosure may further provide a method of making an impeller for a turbomachine, wherein the method includes machining a blank into a base and first and second blades extending from the base, the first and second blades each having a top and a side, wherein the side of each of the first and second blades and the base define a channel between the first and second blades, forming a bridge across the channel using a ceramic slurry, forming a cover on the first and second blades and the bridge using laser cladding, such that the base, the first and second blades, and the cover form a single substantially homogenous structure, and then removing the bridge.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of pieces, arrangements, methods, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Similarly, where a method or sequence is described, the described method is not intended to be limited to only those steps described herein. Rather, additional steps or processes may be added to the method at any point during the method sequence without departing from the scope of the invention. Finally, the exemplary embodiments presented below may be combined in any combination of ways, i.e., any element or method step from one exemplary embodiment may be used in any other exemplary embodiment, without departing from the scope of the disclosure.

Additionally, certain terms are used throughout the following description and claims to refer to particular pieces. As one skilled in the art will appreciate, various entities may refer to the same piece by different names, and as such, the naming convention for the elements described herein is not intended to limit the scope of the invention, unless otherwise specifically defined herein. Further, the naming convention used herein is not intended to distinguish between pieces that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated, and as such each numerical value stated in the description should be interpreted to be "about" the recited value. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
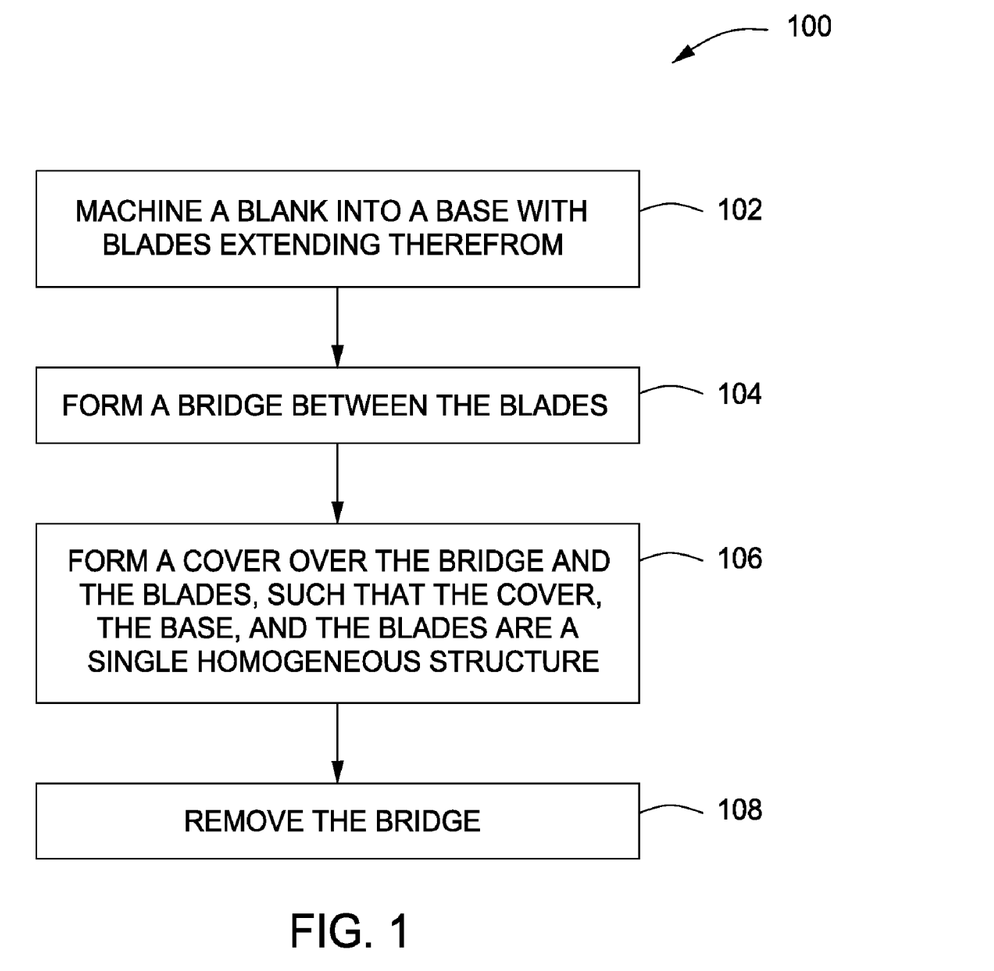
FIG. 1 illustrates a flow chart of an exemplary method of making a one-piece turbomachine part, according to one or more aspects of the disclosure.

FIG. 1 illustrates a flow chart of an exemplary method 100 of forming a turbomachine part, where the part may be an impeller. The method 100 begins at 102 where a blank, which is generally a metal or metal-alloy stock material, is machined into a base with a plurality of appendages such as, for example, a plurality of blades, extending therefrom. The exemplary method 100 continues to 104, where a bridge is formed between the blades, and then at 106 a cover is formed over the blades, such that the cover, the base, and the blades preferably form a single substantially homogenous structure. Finally, at 108 the bridge is removed and the part is completed. Removal of the bridge can include shaking, vibrating, or pushing the bridge out of from between the blades to yield only the remaining metal of the part itself. As the term is used herein, "single homogeneous structure" is generally defined to mean that the microstructure of the part is the same throughout the part, such that there is no significant discernable difference in the microstructure where the cover and the base come together. For example, the single homogeneous structure may be nearly indistinguishable from a structure that is originally cast as a single part. In various embodiments, instead of forming a single, unitary structure that is substantially homogenous at 106, a single, unitary structure that is not homogenous is formed at 106. Each of the respective processes of method 100 will be described in turn, with reference to exemplary embodiments of the pieces which are depicted in the figures.

Figure 2:
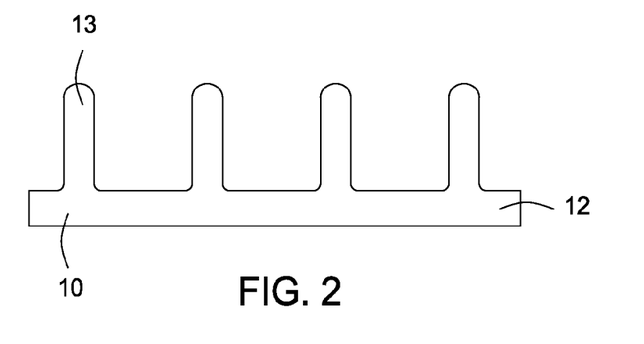
FIG. 2 illustrates a side view of a blank, according to one or more aspects of the disclosure.

FIG. 2, with continuing reference to FIG. 1, illustrates a side view of an exemplary embodiment of a blank 10. The blank 10 is generally machined to include a base 12 and appendages such as, for example, blades 13, extending therefrom. Preferably the blank 10 can include any number of blades 13, for example, 6, 8, 12, or more blades 13 may be included as desired. As will be readily appreciated, the blades 13 may be curved and may extend radially from a middle terminus (not shown) to an outside diameter (not shown) of the base 12, but in other embodiments can extend straight radially out from the middle terminus. Accordingly, the blank 10 can be shaped generally as an impeller lacking a cover, but in other exemplary embodiments, the blank 10 can have the general shape of any turbomachine part, such as a guide vane assembly, a diaphragm, or the like. The blank 10 can be fabricated in any way, for example, the blank 10 can begin as a solid disk or block of forged material, which can be initially milled or machined to form the base 12 having the blades 13 extending therefrom. In another embodiment, the blank 10 can be cast, for example, by investment or injection casting, or the like. In embodiments where the blank 10 is cast, the resulting cast base 10 may still be machined to provide more accurate tolerances in the base 10. In various other embodiments, the blank 10 can be formed by laser deposition or other known processes of forming a turbomachine part. In various embodiments, instead of, or in addition to, the blades 13, the blank 10 may include other types of appendages extending from the base 12 such as, for example, protrusions, walls, protuberances, ribs, supports, beams, members, and/or any combination thereof.

Figure 3:
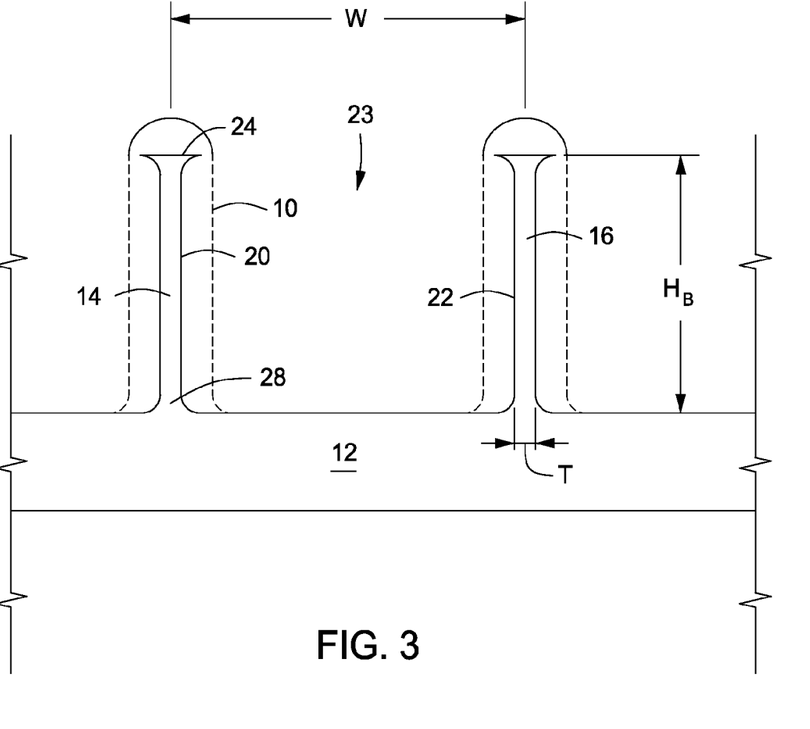
FIG. 3 illustrates an enlarged side view of the blank of FIG. 2, which has been machined into a base and blades, according to one or more aspects of the disclosure.

FIG. 3, with continuing reference to FIG. 1, illustrates an enlarged side view of a portion of the base 12 and first and second blades 14, 16 after the milling process of 102 is performed on the blank 10. The milling process can remove a portion of the first and second blades 14, 16 such that the first and second blades 14, 16 take desired dimensions within a desired dimensional tolerance. For example, the dashed line shows an exemplary embodiment of the blank 10 before the milling process, while the solid lines indicate the blank 10 after the milling process of 102. The milling process can be any suitable milling process, such as 5 axis computer-controlled milling, or other machining processes used in the art. The first and second blades 14, 16 have sides 20, 22, respectively, which define an open channel 23 therebetween. In an exemplary embodiment, channel 23 can be an impeller channel for a centrifugal compressor or a turbine, but in other embodiments can be any type of turbomachine impeller channel.

The desired dimensions of the first and second blades 14, 16 can generally include a height $H_B$ of the blades 14, 16, defined from the intersection of the bottom 28 and the base 12 to the edge of the top 24. In an exemplary embodiment, the height $H_B$ can be from about 0.5 inches to about 5 inches, or can be about 1 inch, but it will be appreciated that substantially any height $H_B$ may be created as desired. The desired dimensions can also include a width W of the channel 23 at the radial outside of the base 12. In various exemplary embodiments, the width W may be from about 1 inch to about 10 inches, or may be about 3 inches, but in various exemplary embodiments can be any width W depending on the application. The dimensions can also include a thickness T of the first and second blades 14, 16, which can be from about 1/16 of an inch to about 5/16 of an inch, or can be about 3/16 of an inch, or can be any other thickness T suitable for a particular application. Furthermore, the dimensions $H_B$, W, and T can change, for example, they may shrink, along the course of the blades 14, 16 as they draw nearer the middle terminus (not shown).

The milling process can also define (i.e., cut) flared or filleted blade tops 24 into the first and second blades 14, 16. The flaring of the tops 24 can increase the top 24 surface area of the first and second blades 14, 16. Similarly, the milling process can also cut flared bottoms 28 such that the cross-section of the first and second blades 14, 16 increases proximal the base 12. The flaring of the bottoms 28 can provide increased strength for the integral formation of the base 12 and the first and second blades 14, 16.

Figure 4:
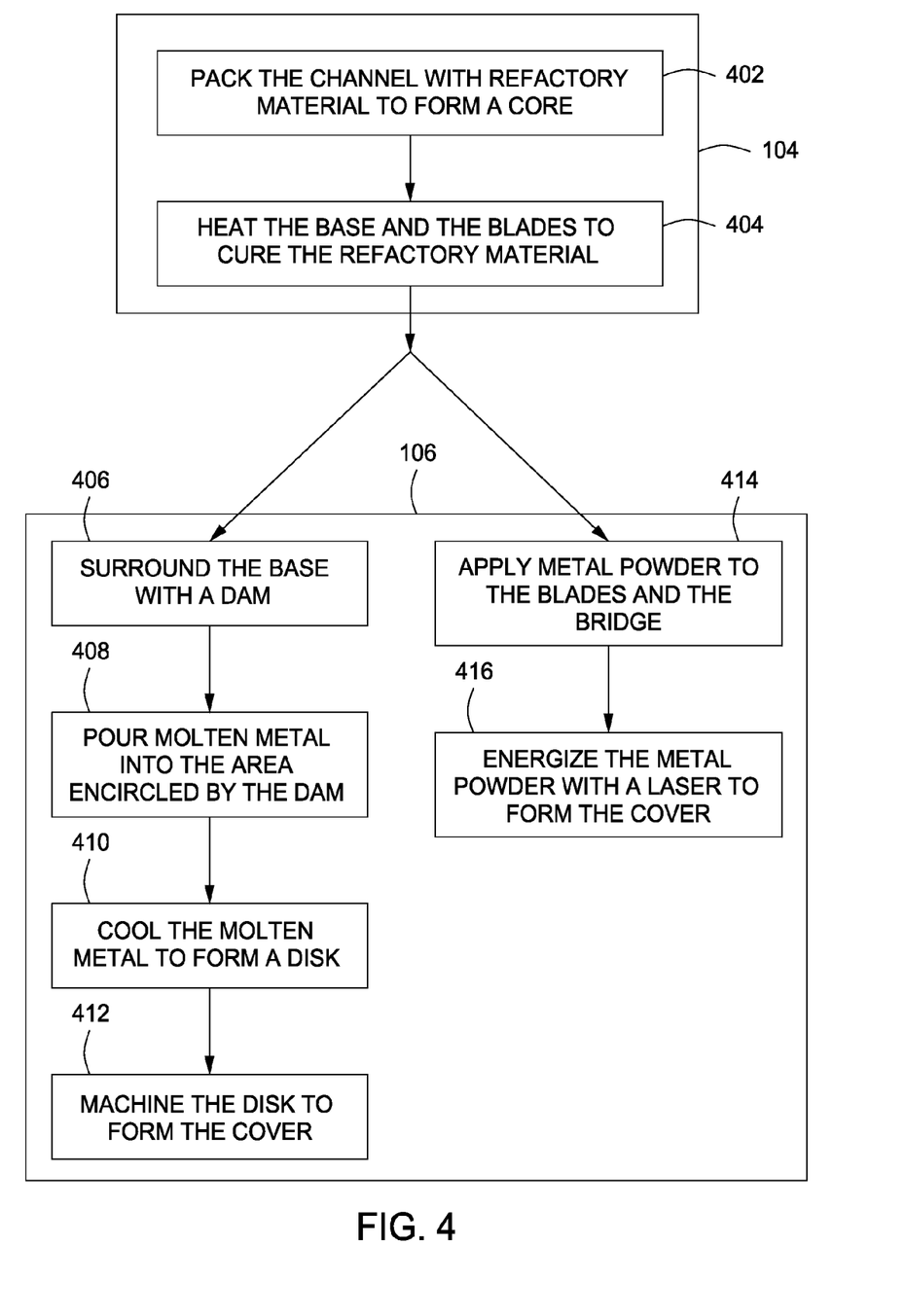
FIG. 4 illustrates a flow chart of an exemplary method of forming the bridges and the cover, according to one or more aspects of the disclosure.
Figure 5:
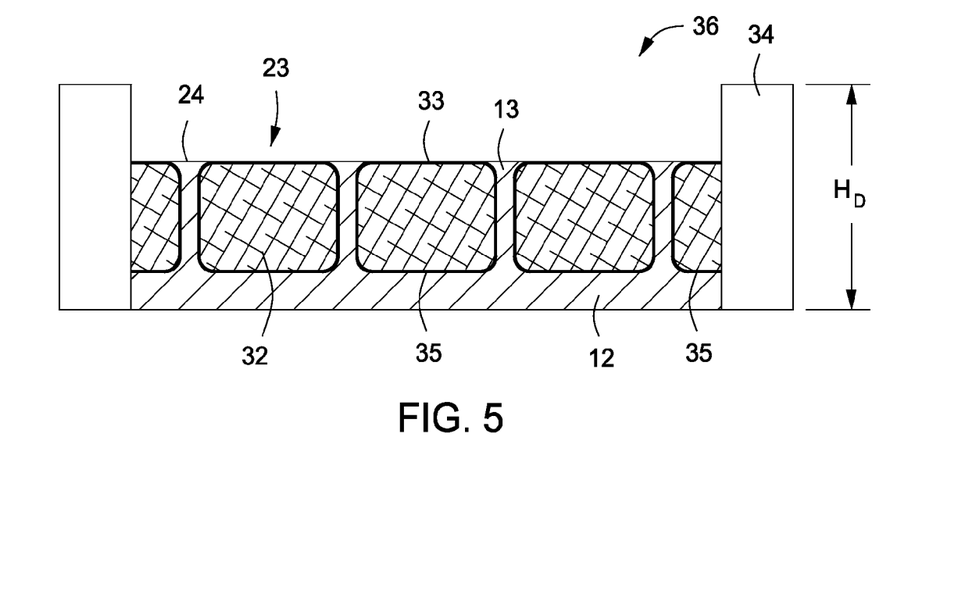
FIG. 5 illustrates a side sectional view of an exemplary embodiment of the base and the blades and dam with a core formed between the blades, according to one or more aspects of the disclosure.

With continuing reference to FIG. 1, FIG. 4 illustrates a flow chart of an exemplary embodiment of forming a bridge, as represented by box 104 in FIG. 4. Additionally, box 106 in FIG. 4 illustrates the process of forming the cover over the base. The process of forming the bridge may begin at 402, where the channels 23 are filled with a refractory material to form a core 32, as shown in FIG. 5. The core 32 can provide bridges 33 across each channel 23, where the bridges 33 are substantially planar and connect adjacent blade tops 24. In at least one embodiment, the refractory material can be resin-coated sand, but in other embodiments can be any suitable cast filling material. The process of forming the bridge may also include heating the base, as shown at 404. The base may be heated to any suitable temperature to cure the resin-coated sand of the core 32. In one embodiment the base 12 may be heated to between about 200° F. to about 500° F.

Excess portions (not shown) of the core 32 can be, for example, struck off with a straight-edged tool prior to or after curing, such that the core 32 is leveled with the tops 24 of the blades 13. As such, in an exemplary embodiment, the core 32 leaves the blade tops 24 uncovered or exposed. The core 32 can also be smoothed to promote a smooth casting surface.

Once the channel is filled with the appropriate casting material, the method may continue to either 406 or 414 to form the cover on or over the base 12. Continuing to 406 involves using a casting process to form the cover, whereas continuing to 414 uses a laser deposition process to form the cover.

Figure 6:
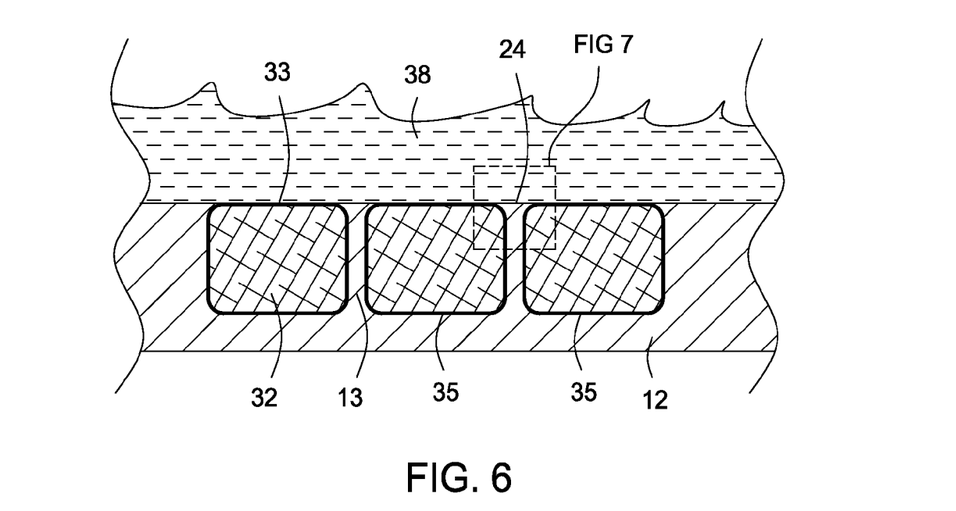
FIG. 6 illustrates an enlarged side sectional view of a portion of FIG. 5, according to one or more aspects of the disclosure.

When the cover is formed by a casting process, the method begins at 406 where the outside diameter of the base 406 is surrounded by a ceramic ring dam 34, as depicted in FIG. 5. The dam 34 can have a height $H_D$ that is greater than the height $H_B$ (FIG. 3) of the blades 13, and further, the dam 34 will generally have a height that is greater than the sum of the blade height $H_B$ plus the height of the cover element being formed on top of the base 10. As such the dam 34 can define a bounded region 36 encircled therein, the bottom of the bounded region 36 being defined by the tops 24 of the blades 13 and the core 32, and the top of the bounded region 36 being defined by the top of the cover being formed thereon, as further described herein. As shown in FIGS. 5 and 6, in one specific embodiment, a layer of carbon 35 may be positioned on one or more sides of the core 32, as will be described in greater detail below. In other embodiments, the layer of carbon 35 may be omitted.

Once the dam 34 is positioned, a molten material, such as molten metal (e.g., steel or other alloy desired to form the part), can be poured, injected, or otherwise applied into the bounded region 36, as shown at 408 in the method of FIG. 4 and as depicted in FIG. 6. In at least one embodiment, the molten material 38 can be made of the same material as the base 12 and the blades 13 and can cover the exposed tops 24 and the core 32. The molten material 38 can be superheated to a temperature in excess of the temperature required to melt the material and thus form the molten material 38. Further, the blades 13 can be pre-heated to a temperature slightly below the melting temperature thereof, such that the amount of heat flux required to raise the blades 13 to the melting temperature thereof is reduced. As such, the molten material 38 can melt a portion of the tops 24 and coalesce thereto when the molten material 38 is poured into the bounded region 36.

Figure 7:
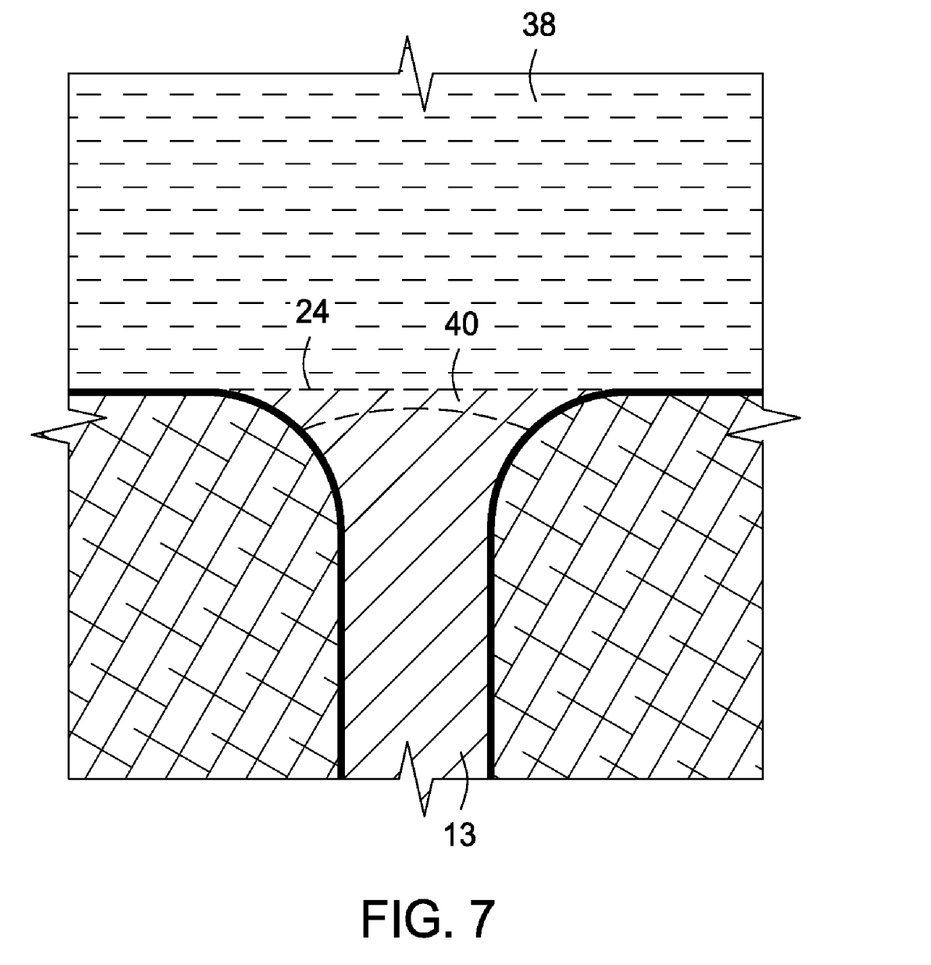
FIG. 7 illustrates an enlarged side sectional view of a portion of FIG. 6, according to one or more aspects of the disclosure.

FIG. 7 shows an enlarged view of the dashed box in FIG. 6, and illustrates a portion of each of the tops 24 that can be melted to form a "melt zone" 40, where the molten material 38 and the tops 24 may coalesce and then cool, as illustrated at 410 of the method of FIG. 4, thereby forming a single substantially homogenous structure. It will be appreciated that the size of the melt zone 40, and the duration of its existence, is at least partially dependant on the temperature of the molten material 38 and the temperature to which the blades 13 are pre-heated, along with the size of the surface 24 and the volume of the molten material 38 used in the process. Accordingly, one with skill in the art will readily understand that these parameters and others can be optimized to result in the desired coalescing of the first and second blades 14, 16 and the molten material 38. Regardless of the specific temperatures and sizes of the parts, embodiments of this disclosure contemplate that the interface or joint between the blades 13 and the cover material 38 will be substantially homogenous and will contain a substantially consistent crystalline structure across the interface between the two portions of the final part.

Figure 8:
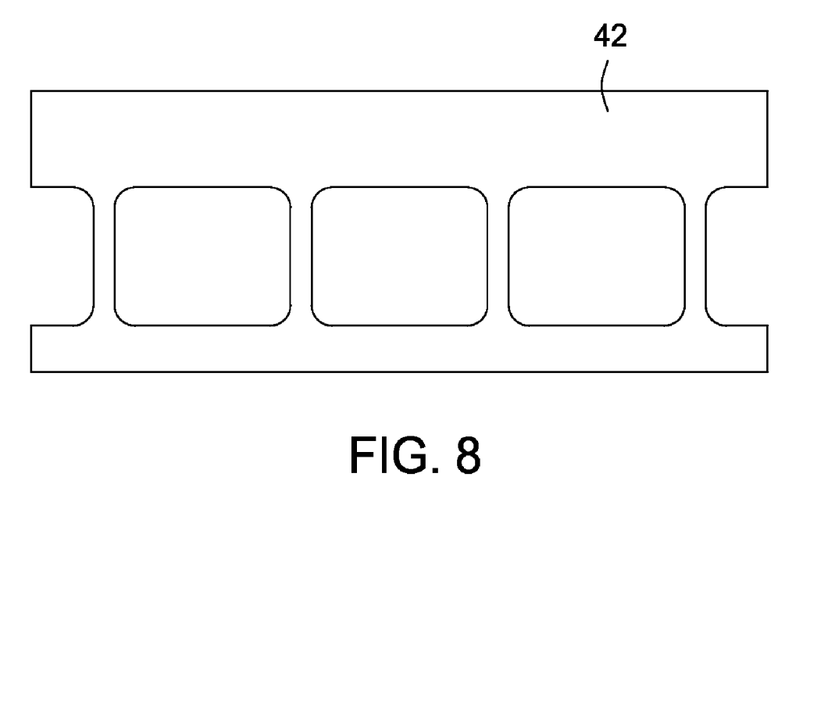
FIG. 8 illustrates a side view of the base and the blades with a cover homogeneously formed therewith, according to one or more aspects of the disclosure.
Figure 9:
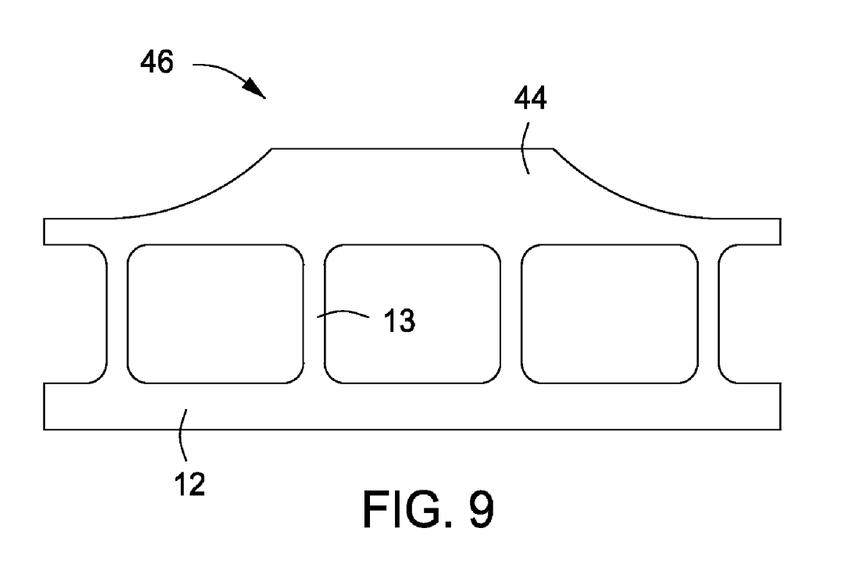
FIG. 9 illustrates a side view of an exemplary embodiment of the turbomachine part, according to one or more aspects of the disclosure.

FIG. 8 illustrates the side view of FIG. 6 once the molten material 38 and the blades 13 have cooled into a solid unitary piece or part, as at 410 in the method of FIG. 4. Upon cooling, the molten material 38 may harden into a disk 42, and the dam 34 can subsequently be removed. As shown in FIG. 9 and described at 412 in the method of FIG. 4, the cover portion 44 of the disk 42 can then be milled into the desired shape. The core material 32 (FIG. 5) can then be removed, for example, by shaking, vibrating, pounding, or pushing the core 32 out, as previously described at 108 in the method of FIG. 1. As such, the remaining structure is a one-piece or unitary turbomachine part 46, in which the blades 13, the base 12, and the cover 44 have a substantially homogenous structure across the joint or interface between the respective elements.

With reference to FIGS. 1-8, to form the desired homogenous microstructure, and thereby form a continuous turbomachine part 46, the pre-heat temperature of the blades 13 and the temperature of the molten metal are controlled. This ensures proper melting of the blades 13 in the melt zone 40 (FIG. 7), which enables the desired one-piece structure to form. However, the temperature is also controlled to avoid negative effects of over-melting or oxidizing the blades 13, which can inhibit the precision of the structure, inhibit the formation of a homogenous microstructure, or both.

Accordingly, tests indicate that the pre-heat temperature depends on at least two factors: the thickness T of the blade 13 and the material's tendency to oxidize. Thicker, more massive blades 13 require more energy to melt and therefore a higher pre-heat temperature is desired. However, such increased temperatures may not be practical for metals that oxidize, for example, titanium. Titanium tends to oxidize above about 400° F. compared to, for example, stainless steel alloys, which can be heated to temperatures above about 1800° F. without oxidation.

The optimum temperature of the molten material 38 is also dependent on the material chosen for the turbomachine part 46 and the thickness of the blades 13. Metals with higher melting temperatures require a higher temperature molten material to melt the melt-zone 40 of the blades 13. Similarly, more massive (i.e., thicker) blades 13 require more energy to melt, and thus a higher temperature for the molten material 38 is required.

Continuing with the special case of titanium impellers, which can apply to any metal or alloy that tends to oxidize, the molten titanium itself may be subject to oxidation during solidification. Further, the base 12 and blades 13 are also heated by their contact and proximity to the molten titanium and thus may also risk oxidation. To avoid oxidation during solidification of the cover 44 and heating and cooling of the base 12 and blades 13, the layer of carbon 35 (FIGS. 5 and 6) may be interposed between the core 32 of refractory material (e.g., resin-coated sand) and the metal of any of the blades 13, base 12, and/or cover 42 of the turbomachine part 44 prior to and/or during casting. This carbon layer 35 inhibits the oxidizing reactions that may otherwise occur due to the interaction between the hot titanium and the refractory material (i.e., sand).

Figure 10:
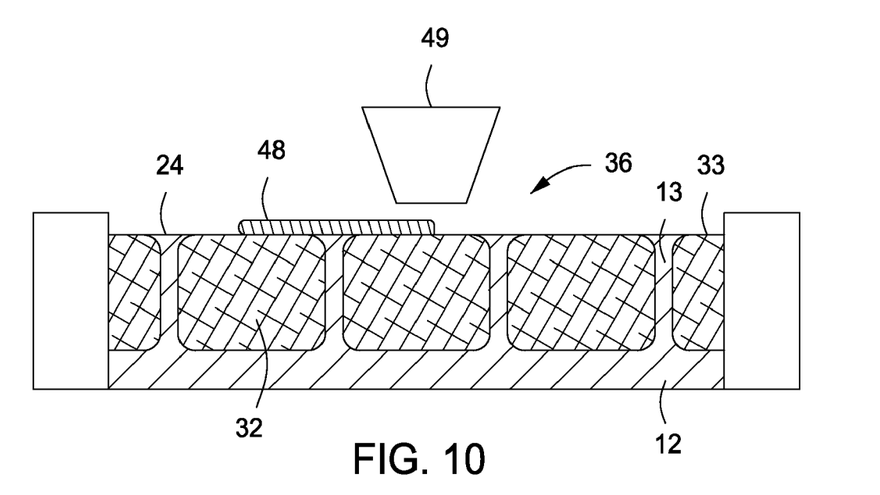
FIG. 10 illustrates a simplified side sectional view of a base and blades undergoing a laser deposition process, according to one or more aspects of the disclosure.

Referring again to FIG. 4, instead of, or in addition to, pouring the molten material into the area encircled by the dam, a laser deposition process, which can also be known as a pulsed laser deposition process or a laser cladding process, can be used to form the cover, as shown at 106 in the method of FIG. 4. The laser deposition process can be similar to the process described in U.S. Pat. No. 5,612,887, the entirety of which is incorporated herein by reference to the extent it is not inconsistent with this disclosure. The laser deposition process may include applying a metal powder and using a laser, for example, a high-intensity UV laser. As depicted in FIG. 10, the laser can target sequential sections of the tops 24 and the bridges 33 such that the laser energizes the metal powder with a plume 49 of laser-generated heat, which may be a plasma in at least one embodiment of the disclosure, thereby melting the powder. The melted powder can then deposit on the tops 24 and the bridges 33 as a molten metal material, as shown in the method of FIG. 4 at 416. The melted powder forms a layer of metal 48 over the tops of the core material 32, which is continuous and homogenous with the tops 24 of the blades 13.

Figure 11:
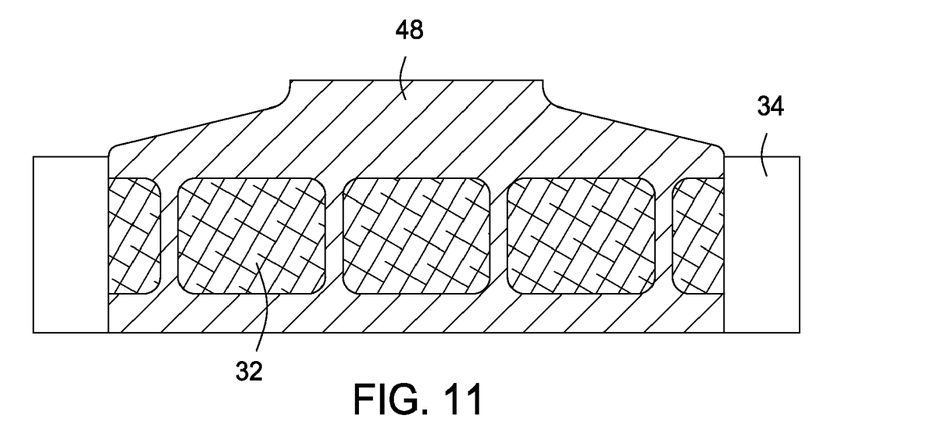
FIG. 11 illustrates a side view of an exemplary cover formed by the laser deposition process, according to one or more aspects of the disclosure.

The layer of metal 48 typically does not bond to the core 32 forming the bridges 33, such that the bridges 33 act as a substrate. The process of depositing the layer of metal 48 can be repeated until, as shown in FIG. 11, the cover 44 results from the repetition of the laser deposition process. The cover 44 can be formed from this process without necessitating additional milling. In various exemplary embodiments, however, some final milling may be desired.

Figure 12:
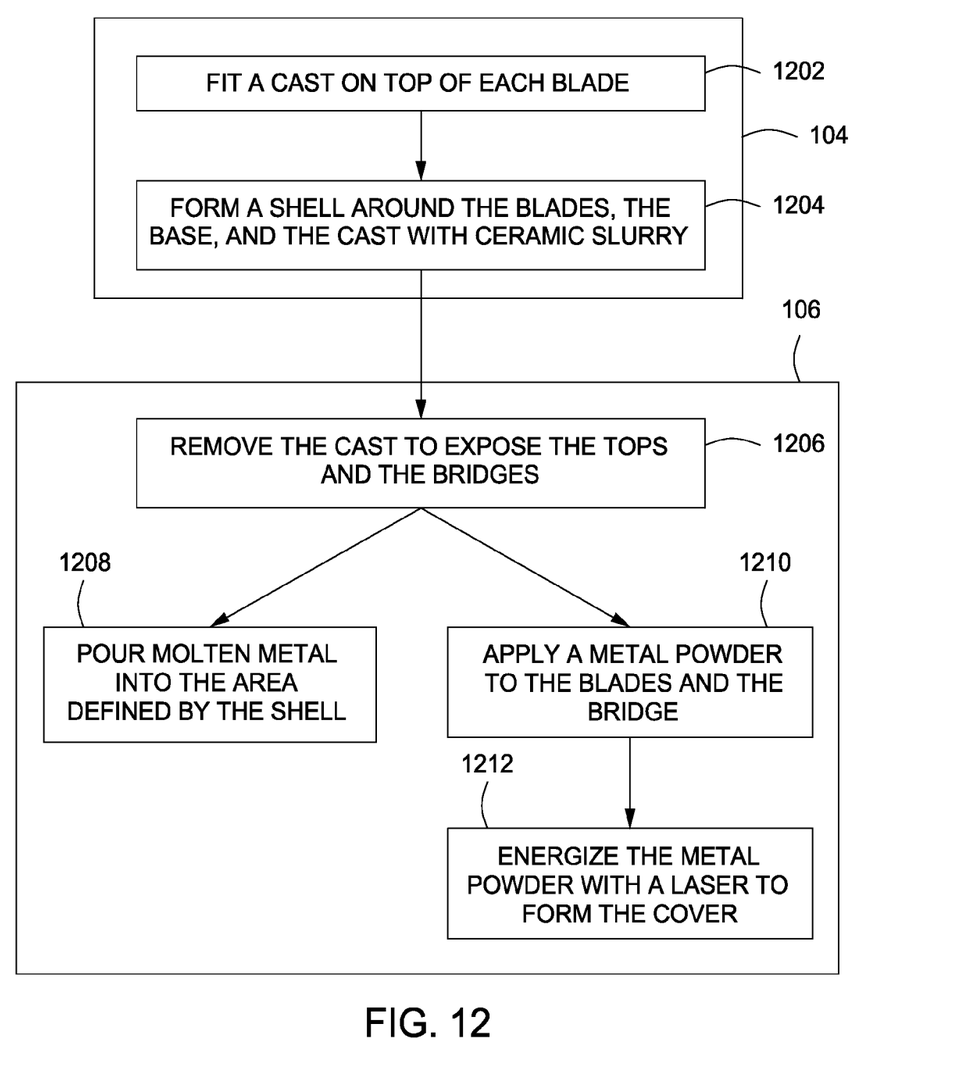
FIG. 12 illustrates a flow chart of another exemplary method of forming the bridge and the cover, according to one or more aspects of the disclosure.
Figure 13:
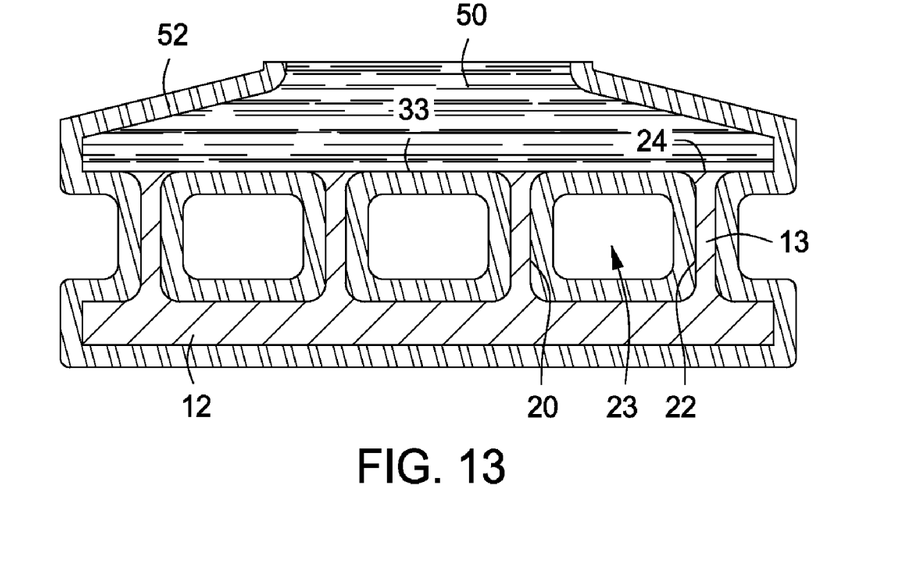
FIG. 13 illustrates a side sectional view of an exemplary embodiment of the base, the blades, a cast fitted thereon, and a shell formed therearound, according to one or more aspects of the disclosure.

FIG. 12 illustrates a flow chart of another exemplary embodiment of forming the bridge, as at 104, and at least two exemplary embodiments of forming the cover, as at 106. At 1202, as illustrated in FIG. 13, a cast or wax pattern 50 can be fitted on the tops 24 of the blades 13. The channel 23 can be open under the wax pattern 50, thereby exposing the sides 20, 22 and the base 12. Ceramic slurry (not shown) can then be applied to the base 12, the blades 13, and the exterior of the wax pattern 50, such that the slurry can adhere to any exposed portions of the base 12, blades 13, and wax pattern 50. The slurry buildup can form a shell 52, as at 1204. The shell 52 can form the bridges 33 between adjacent blades 13, and the shell 52 can also form around the outside of the wax pattern 50.

The wax pattern 50 can then be removed from inside of the shell 50, as at 1206. In one or more embodiments, the wax pattern 50 can be made of wax, a polymer, or any suitable material, which can be removed, for example, by melting and draining, to expose the tops 24 and the bridges 33 across the channels 23. In an exemplary embodiment, the inside of the shell 52 can have a cover-shaped area 53 (FIG. 14) now vacated by the wax pattern 50.

Once the wax pattern 50 is removed, the method may continue to either 1208 or 1210 to form the cover on or over the base 10. Continuing to 1208 involves using a casting process to form the cover, whereas continuing to 1210 uses a laser deposition process to form the cover.

Figure 14:
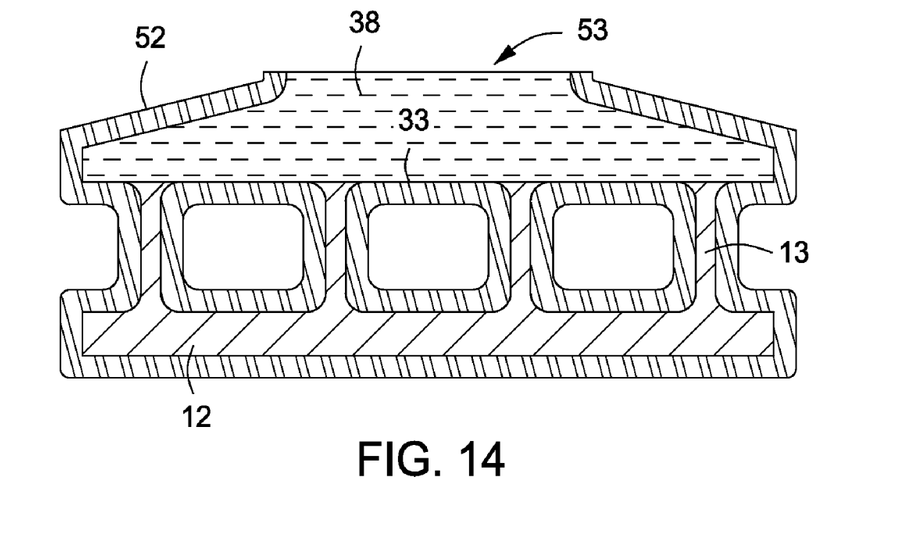
FIG. 14 illustrates the sectional view of FIG. 13, with the wax pattern removed and a molten material poured into the shell, according to one or more aspects of the disclosure.

When using the casting process, as illustrated in FIG. 14, the molten material 38 can be poured into the cover-shaped area 53, now defined by the shell 52, the tops 24, and the bridges 33, as at 1208 of the method of FIG. 12. As described above with reference to FIG. 7, the molten material 38 can melt a melt zone 40 of each of the blades 13, such that the blades 13 and the molten material 38 blend together or coalesce. The molten material 38 can be cooled and hardened into the cover 44, as shown in FIG. 9, thereby forming the single homogeneous turbomachine part 46. However, in other exemplary embodiments, the molten material 38 can harden into a disk, similar to the disk 42, shown in and described above with reference to FIG. 8, which may subsequently be machined to the dimensions of the cover 44. The shell 52 and the bridges 33 can be removed, for example, by vibrating or shaking the turbomachine part 46, as at 108 of FIG. 1.

Figure 15:
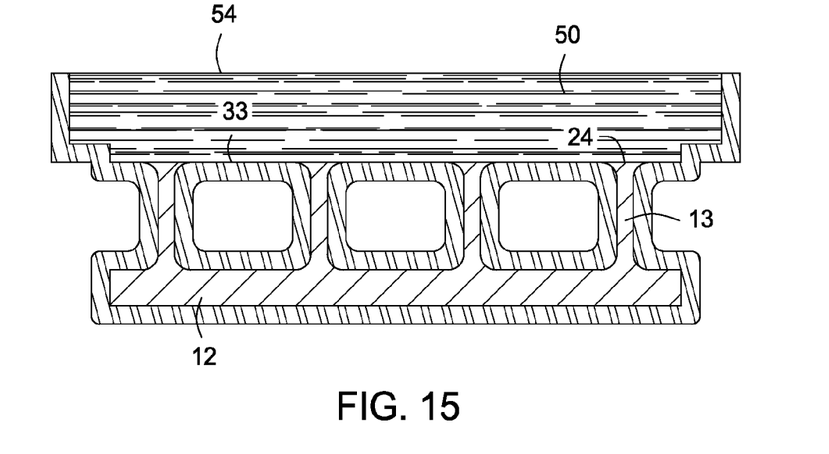
FIG. 15 illustrates a side sectional view of an exemplary disk-shaped cast fitted over the blades in preparation for the laser deposition process, according to one or more aspects of the disclosure.
Figure 16:
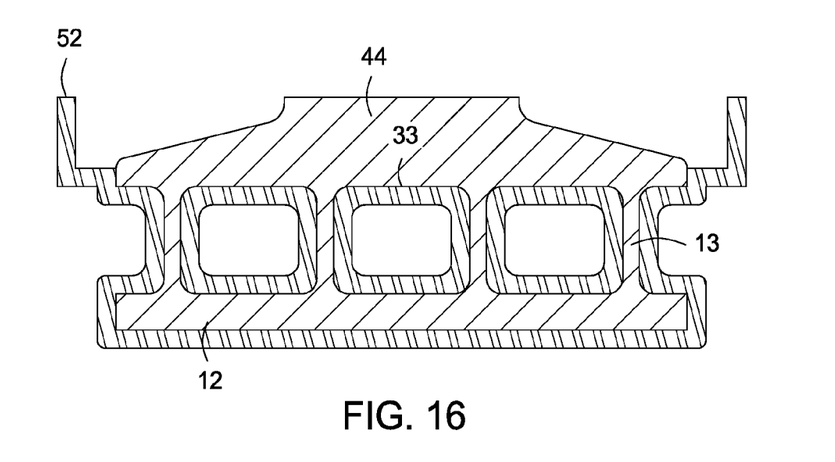
FIG. 16 illustrates a side sectional view of an exemplary embodiment of the cover formed by the laser deposition process using the shell, according to one or more aspects of the disclosure.

Referring back to FIG. 12, laser deposition may be used to form the cover, as at 1210. The laser deposition process, as described above with reference to FIG. 10, can be employed by applying, for example blowing, metal powder to the tops 24 and the bridges 33 and melting the metal powder with laser-generated plasma. As illustrated in FIG. 15, the wax pattern 50 of this embodiment can be similar to the embodiment of the wax pattern 50 described above with reference to FIG. 13 and may be shaped, for example, as a disk. Accordingly, it may not be necessary to form the shell 52 over the top 54 of the wax pattern 50, as the wax pattern 50 may not define the final dimensions desired for the cover 44. Further, providing the open top 54 can facilitate access to the tops 24 and the bridges 33 during the laser deposition process. The laser deposition process can provide accurate dimensions for the cover 44, as shown in FIG. 16, or, in various other exemplary embodiments, the cover 44 may be finish-milled to the precise dimensions required. The bridges 33 and the shell 52 can then be removed, as at 108 of FIG. 1.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A method of making a turbomachine part, comprising:
   machining a blank into a base having first and second blades extending therefrom, the first and second blades each having a side, the side of each of the first and second blades together defining a channel therebetween;
   forming a bridge in the channel between the first and second blades;
   forming a cover on first and second tops of the first and second blades, respectively, and over the channel, such that the base, the first and second blades, and the cover form a single substantially homogenous structure; and
   removing the bridge.

2. The method of claim 1, wherein forming the bridge comprises:
   packing the channel with a resin-coated sand; and
   curing the resin-coated sand by heating the base and the first and second blades.

3. The method of claim 2, wherein forming the bridge further comprises striking off an excess portion of the resin-coated sand, such that the bridge is level with the first top of the first blade and the second top of the second blade.

4. The method of claim 2, further comprising disposing a layer of carbon between the resin-coated sand and the cover and between the resin-coated sand and the first and second blades.

5. The method of claim 1, wherein machining the blank comprises flaring the first and second tops of the first and second blades, respectively.

6. The method of claim 1, wherein forming the cover further comprises disposing a dam around an outside diameter of the base, wherein the dam has a dam height that is greater than a height of the first and second blades.

7. The method of claim 6, wherein forming the cover comprises:
   pouring molten metal into an area defined by the first top of the first blade, the bridge, the second top of the second blade, and the dam, wherein pouring the molten metal comprises melting melt zones of the first and second tops such that the melt zones and the molten metal blend together; and
   cooling the molten metal to provide the turbomachine part having the single essentially homogeneous structure.

8. The method of claim 1, wherein forming the cover comprises:
   applying a metal powder to the bridge and the first and second tops of the first and second blades;
   energizing the metal powder with a laser generated heat source; and
   depositing molten metal on the first and second tops and the bridge.

9. A method of making a turbomachine part, comprising:
   machining a blank into a base and first and second blades extending from the base, the first and second blades each having a top and a side, wherein the side of each of the first and second blades and the base together define a channel between the first and second blades;
   forming a bridge across the channel using a ceramic slurry;
   forming a cover on the first and second blades and the bridge such that the base, the first and second blades, and the cover form a single substantially homogenous structure; and
   removing the bridge.

10. The method of claim 9, further comprising fitting a cast on the top of each of the first and second blades and across the channel, such that the cast prevents the ceramic slurry from building up on the top of each of the first and second blades.

11. The method of claim 10, wherein forming the cover further comprises:
    forming a shell using the ceramic slurry around an outside of the cast;
    removing the cast to leave a cover region defined by the shell, the top of each of the first and second blades, and the bridge;
    filling the cover region with molten metal, wherein the molten metal melts a portion of the first and second blades, such that the portion of the first and second blades and the molten metal coalesce; and
    cooling the molten metal to form a unitary turbomachine part.

12. The method of claim 9, wherein forming the cover further comprises:
    removing the cast;
    disposing a dam around an outside diameter of the base, wherein the dam has a height that is greater than a maximum height of the first and second blades; and
    pouring molten metal into an area defined by the top of each of the first and second blades, the bridge, and the dam, wherein pouring the molten metal melts melt zones of the first and second blades such that the molten metal blends together with the melt zones of the first and second blades to form a homogeneous interface.

13. The method of claim 12, further comprising pre-heating the first and second blades prior to pouring the molten metal.

14. The method of claim 12, wherein:
    pouring the molten metal comprises creating a disk defined by the area; and
    forming the cover further comprises machining the disk such that an outside of the disk has a cover shape.

15. The method of claim 10, further comprising:
    removing the cast;
    blowing metal powder toward the tops of the first and second blades; and
    energizing the metal powder with a laser generated heat source to deposit a molten metal on the tops.

16. A method of making an impeller for a turbomachine, comprising:
    machining a blank into a base and first and second blades extending from the base, the first and second blades each having a top and a side, wherein the side of each of the first and second blades and the base define a channel between the first and second blades;
    forming a bridge across the channel using a ceramic slurry;
    forming a cover on the first and second blades and the bridge using laser cladding, such that the base, the first and second blades, and the cover form a single substantially homogenous structure; and
    removing the bridge.

17. The method of claim 16, wherein forming the bridge comprises:
heating the base and the first and second blades; and
packing the channel with a resin-coated sand, such that the heat from the base and the first and second blades cures the resin-coated sand; and
striking off an excess portion of the resin-coated sand, such that the bridge is level with the top of the first blade and the top of the second blade.

18. The method of claim 16, wherein forming the bridge comprises:
fitting a cast on the top of each of the first and second blades and across the channel, such that the cast prevents the ceramic slurry from building up on the tops of the first and second blades; and
applying the ceramic slurry to the channel, such that the ceramic slurry builds up between the first and second blades to provide the bridge.

19. The method of claim 18, wherein forming the cover comprises:
removing the cast;
introducing a metal powder directed toward the tops of the first and second blades;
energizing the metal powder with the laser generated heat; and
depositing a layer of metal on the tops of the first and second blades and across the bridge.

20. The method of claim 16, wherein machining the blank comprises flaring the tops of the first and second blades to provide an increased surface area of the tops of the first and second blades.

* * * * *

UNITED STATES PATENT AND TRADEMARK OFFICE
CERTIFICATE OF CORRECTION

| | | |
|---|---|---|
| PATENT NO. | : 8,151,862 B2 | Page 1 of 1 |
| APPLICATION NO. | : 12/917750 | |
| DATED | : April 10, 2012 | |
| INVENTOR(S) | : Kevin Pickrell and Mark J. Kuzdal | |

It is certified that error appears in the above-identified patent and that said Letters Patent is hereby corrected as shown below:

Title Page, Item (57)
In the Abstract, delete line 1 and replace with the following:
"A Method of making a turbomachine part, wherein the method can"

In Fig. 4 delete the text the block identified by reference number 402 and replace with the following:
"PACK THE CHANNEL WITH REFRACTORY MATERIAL TO FORM A CORE"

In Fig. 4 delete the text the block identified by reference number 404 and replace with the following:
"HEAT THE BASE AND THE BLADES TO CURE THE REFRACTORY MATERIAL"

Signed and Sealed this
Twelfth Day of June, 2012

David J. Kappos
*Director of the United States Patent and Trademark Office*